(12) United States Patent
Romeu Guardia

(10) Patent No.: US 10,695,697 B2
(45) Date of Patent: Jun. 30, 2020

(54) DEVICE FOR TREATING A SLURRY BY SEPARATING SOLIDS FROM LIQUIDS

(71) Applicant: Rotecna, S.A., Agramunt, Lleida (ES)

(72) Inventor: Gener Romeu Guardia, Agramunt (ES)

(73) Assignee: ROTECNA, S.A., Agramunt (ES)

( * ) Notice: Subject to any disclaimer, the term of this patent is extended or adjusted under 35 U.S.C. 154(b) by 297 days.

(21) Appl. No.: 15/801,248

(22) Filed: Nov. 1, 2017

(65) Prior Publication Data
US 2018/0117505 A1 May 3, 2018

(30) Foreign Application Priority Data

Nov. 2, 2016 (ES) .................................. 201631399

(51) Int. Cl.
*B01D 29/82* (2006.01)
*B01D 29/64* (2006.01)
(Continued)

(52) U.S. Cl.
CPC .............. *B01D 29/826* (2013.01); *A01C 3/00* (2013.01); *B01D 29/0097* (2013.01);
(Continued)

(58) Field of Classification Search
CPC .. B01D 29/0097; B01D 29/035; B01D 29/56; B01D 29/6415; B01D 29/6476;
(Continued)

(56) References Cited

U.S. PATENT DOCUMENTS

| 792,262 A | 6/1905 | Hay et al. |
| 4,634,524 A | 1/1987 | Huber |

(Continued)

FOREIGN PATENT DOCUMENTS

| CA | 2509966 A1 | 12/2006 |
| CA | 2713249 A1 | 2/2011 |

(Continued)

OTHER PUBLICATIONS

Extended European Search Report in connection with European Patent Application No. 17382710.6 dated Mar. 15, 2018.
(Continued)

*Primary Examiner* — Ana M Fortuna
(74) *Attorney, Agent, or Firm* — Knobbe, Martens, Olson & Bear LLP

(57) ABSTRACT

A device includes a compartment for separating the solids and liquids. The compartment includes a base that is concavely curved according to a cylindrical portion having a transverse axis and is formed of a sieve, an idler roller mounted transversely on an arm, a drive which actuates the arm, and resilient means for adjusting the pressure exerted by the rollers. Both the contact interface between the sieve and the roller and the rotational interface between the roller and the arm are made of a non-metal material on at least one of the two contacting surfaces that form each of the interfaces, such that, there is no metal-on-metal contact between surfaces moving relative to one another at the interfaces.

11 Claims, 7 Drawing Sheets

(51) Int. Cl.
*A01C 3/00* (2006.01)
*B01D 29/00* (2006.01)
*B01D 29/56* (2006.01)
*B30B 9/20* (2006.01)
*B01D 29/03* (2006.01)

(52) U.S. Cl.
CPC ......... *B01D 29/56* (2013.01); *B01D 29/6415* (2013.01); *B01D 29/6476* (2013.01); *B01D 29/035* (2013.01); *B30B 9/20* (2013.01)

(58) Field of Classification Search
CPC ...... B01D 29/826; B01D 33/646; B30B 9/20; C05F 3/00; C05F 17/0018; C05F 3/06; A01K 67/033; B09C 1/002; B09C 1/10
See application file for complete search history.

(56) References Cited

U.S. PATENT DOCUMENTS

| | | | |
|---|---|---|---|
| 5,268,100 | A | 12/1993 | Hartzell |
| 5,462,677 | A * | 10/1995 | Benesi ............... B01D 25/1275 100/198 |
| 5,628,912 | A | 5/1997 | Nesseth |
| 6,250,476 | B1 * | 6/2001 | Kroon .................... B01D 33/04 209/272 |
| 2003/0078147 | A1 * | 4/2003 | Siebert .................. B05C 1/0808 492/56 |
| 2003/0146174 | A1 * | 8/2003 | Hansen .................. B01D 9/005 210/770 |
| 2004/0129611 | A1 | 7/2004 | Whitsel et al. |
| 2004/0214701 | A1 * | 10/2004 | Wirtz .................... B41F 27/105 492/49 |
| 2006/0273048 | A1 | 12/2006 | Doyle et al. |
| 2007/0289917 | A1 | 12/2007 | Mylin et al. |
| 2010/0326151 | A1 | 12/2010 | Madigan et al. |
| 2012/0043285 | A1 | 2/2012 | van Logtenstein |
| 2013/0105413 | A1 | 5/2013 | Houle |

FOREIGN PATENT DOCUMENTS

| | | |
|---|---|---|
| CN | 1378269 A | 11/2002 |
| CN | 202555053 U | 11/2012 |
| CN | 205270113 | 6/2016 |
| CO | 93417895 | 11/1993 |
| CO | 02108517 | 2/2004 |
| DE | 3837956 A1 | 5/1990 |
| DE | 10 2007 016 443 A1 | 10/2008 |
| EP | 0 590 792 A2 | 4/1994 |
| EP | 0590792 A3 | 4/1994 |
| EP | 043 509 6 B1 | 2/1995 |
| ES | 1026084 U | 3/1994 |
| ES | 1026084 U | 3/1994 |
| ES | 2112720 A1 | 4/1998 |
| FR | 2844804 B1 | 2/2017 |
| GB | 1 447 755 A | 9/1976 |
| KR | 101347874 B1 | 1/2014 |
| KR | 101667540 B1 | 10/2016 |
| SU | 1114441 A | 9/1984 |
| SU | 1340623 A2 | 9/1987 |
| SU | 1665903 A1 | 7/1991 |
| WO | WO 03/064050 A1 | 8/2003 |
| WO | WO 2011064443 A1 | 6/2011 |
| WO | WO 2011/090092 A1 | 7/2011 |

OTHER PUBLICATIONS

Search Report received in Russian Patent Application No. 2017137753/10(065931) dated Jan. 31, 2019.
Office Action received in Russian Patent Application No. 2017137753/10(065931) dated Feb. 1, 2019.
Search Report/Patentability Exam received in Colombian Patent Application No. NC2017/0010869 dated Jun. 7, 2019.

* cited by examiner

DEVICE FOR TREATING A SLURRY BY SEPARATING SOLIDS FROM LIQUIDS

The present invention relates to slurry treatment machines, specifically to machines which separate the solids from the liquids in said slurry.

The term "slurry" refers to livestock waste, waste from pigs being of particular relevance, consisting of a mixture of solid and liquid excrement, i.e. of faeces and urine, and conventionally mixed with water used for cleaning the barns. Slurry has traditionally been used as plant food; it is recycled into organic fertilizer for cultivated land, thus saving on chemical fertilizer and costs.

In order to separate the solid and liquid phases in the slurry, methods such as sedimentation and centrifugation and static or dynamic sieving or filtration, among others, are used.

ES2112720A1 discloses machines for carrying out separation by dynamic sieving which comprise a frame for supporting the elements of the machine and a tank, the upper portion of which has compartments for separating said solid and liquid phases making up the slurry. Each compartment has a base that is concavely curved according to a cylindrical portion having a transverse axis and is formed of a sieve, above which idler rollers move, which are transversely mounted on a pair of parallel arms and arranged in the manner of vanes which rotate about a transverse shaft and are actuated by driving means, the rotational movement of the rollers of both compartments being synchronised. When the machine is in operation, the slurry entering the compartments is pressed and the liquids pass through the corresponding sieve, are collected at the bottom of a basin positioned below the sieves, and are drained out; the solids are discharged through an outlet located next to the terminal end of the last sieve. In each compartment, there is a second pair of parallel arms which are arranged in the manner of vanes, are rigidly connected, in terms of movement, to the arms supporting the rollers, and each comprise transversely mounted brushes that are in parallel with the rollers, each of which brushes is located next to each roller and downstream thereof in the direction of rotation of the arms, the rollers being activated counter to the corresponding sieve by resilient means that can be adjusted in terms of the pressure exerted by the rollers on the slurry being treated.

In general, all the components of said machine are made of metal, preferably stainless steel, as stainless steel is extremely resistant to corrosion in alkaline environments, as in the case of slurry, which has a pH of 7.5 to 8 for the solid fraction and up to more than 10 for the liquid fraction.

However, a disadvantage of the previously mentioned machine is that, unexpectedly, it broke down several times on account of immobilisation of the movable components thereof, in particular at the interfaces between cylinder and sieve and in the region of the bearing of the cylinder, and on account of wear of the components thereof. The reason for this unexpected behaviour is not known.

The applicant has discovered that, surprisingly, said immobilisation can be more or less eliminated and the wear significantly reduced if one of the surfaces of the interface between the sieve and the cylinder is not made of metal. In order to better ensure that this is achieved, it is preferable for one of the surfaces in the region of the bearing of the cylinder to be not made of metal. Without wishing to limit the invention to a specific invention, it appears that the problem may be due to electrical interactions that may be produced by the metal ions present in the slurry, in particular in the solid phase, when these are located between two metals moving relative to one another, thereby allowing the elements on opposite sides of the interface to have different potentials. By making one of the surfaces out of a non-metal material, the aforementioned electrical bridge is broken, thus solving the problem.

More specifically, the present invention discloses a device for treating slurry by separating the solids and the liquids in said slurry, comprising:
- a frame for supporting the elements of the machine;
- at least one compartment for separating the solids and the liquids, said compartment comprising a base that is concavely curved according to a cylindrical portion having a transverse axis and is formed of a sieve;
- at least one idler roller that is mounted transversely on at least one arm, said arm rotating about a first transverse shaft, a rotational interface also being defined between said arm and said idler roller, which interface allows said idler roller to rotate freely about a second transverse shaft, such that a contact interface is defined between an outer surface of the idler roller and said sieve;
- driving means which rotate said arm about the first transverse shaft, and
- resilient means for adjusting the pressure exerted by the rollers on the sieve, such that the rotation of the arm presses the slurry entering the machine against the sieve, and said liquids pass through the corresponding sieve,
wherein
the contact interface between the sieve and the roller, and preferably also the rotational interface between the roller and the arm, is made of a non-metal material on at least one of the two contacting surfaces that form said interface or interfaces, such that, at said interface or interfaces, there is no metal-on-metal contact between surfaces moving relative to one another.

Preferably, the roller is coated in a non-metal material, preferably an elastomer.

Preferably, on at least one of its ends, the roller has a shaft portion that is inserted into a hole or recess in a subcomponent which is made of a non-metal material and attached to said arm, said shaft portion coming into contact with said subcomponent at the surface of said hole or recess, the shaft portion rotating with respect to said subcomponent inside said hole.

For a similar purpose, the device according to the present invention advantageously comprises a slurry inlet to the device which leads into a reservoir having a first reservoir outlet positioned at a higher hydraulic level than said slurry inlet, said first outlet leading into said separation compartment, a sieve for retaining solids being arranged between said inlet and said outlet. Preferably, said sieve for retaining solids comprises square holes, the sides of which are 1 cm long or less.

Preferably, on at least one of its ends, the roller has a shaft portion that is inserted into a hole or recess in a subcomponent which is made of a non-metal material and attached to said arm, said shaft portion coming into contact with said subcomponent at the surface of said hole or recess, the shaft portion rotating with respect to said subcomponent inside said hole.

More preferably, the compartment comprises a second arm that is capable of rotating about said first transverse shaft, said second arm likewise having a rotational interface between said second arm and a second idler roller, which interface allows said second idler roller to rotate freely about a third transverse shaft, such that a contact interface is defined between an outer surface of the second roller and said sieve.

Advantageously, the device according to the present invention comprises at least one transverse brush that is parallel to the idler roller and/or second idler roller and downstream thereof in the direction of movement of said arms about said first transverse shaft. Advantageously, too, the device comprises at least two of said separating compartments arranged in series, such that the slurry passes through both compartments sequentially.

To aid understanding, explanatory yet non-limiting drawings of an embodiment of the subject matter of the present invention are included.

Figure 1:
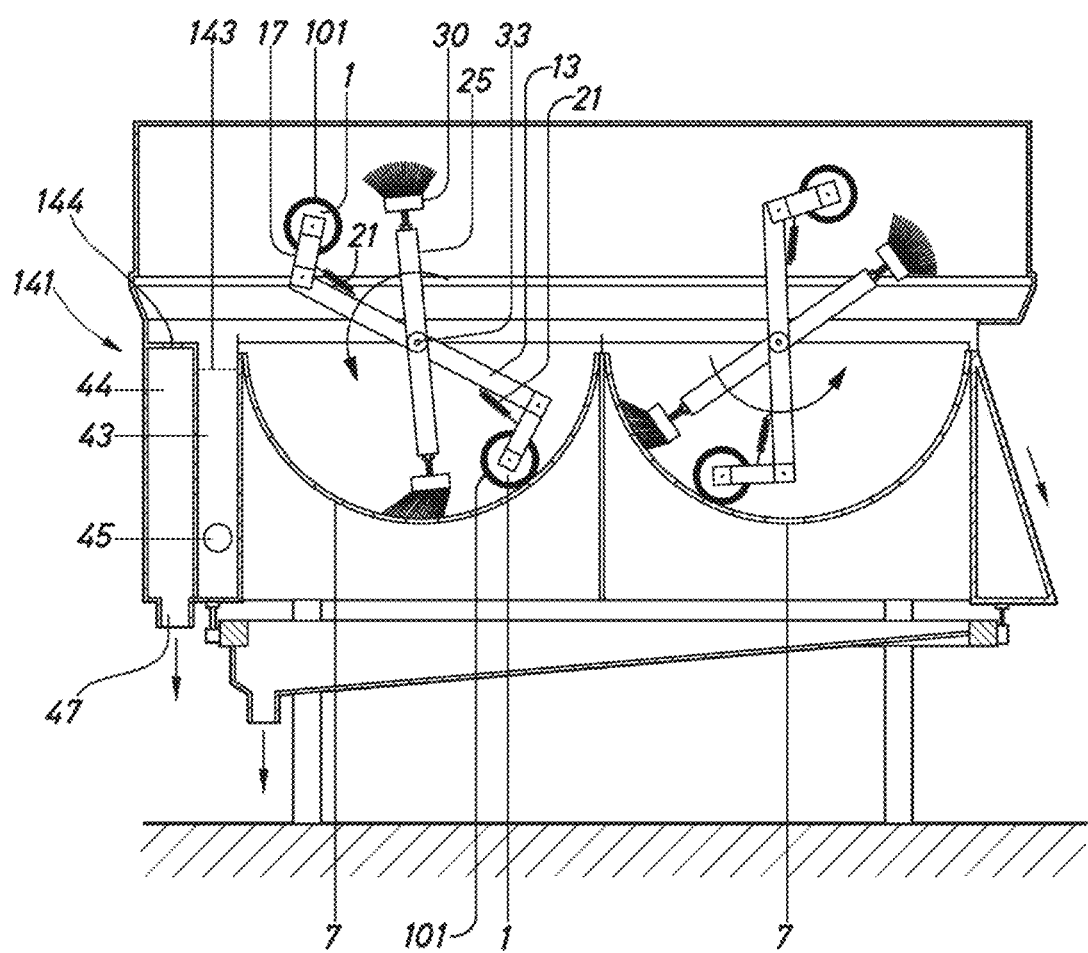
FIG. 1 is a sectional view along a longitudinal plane of symmetry of an embodiment of a device according to the present invention, in which the internal members of the machine can be seen.
Figure 2:
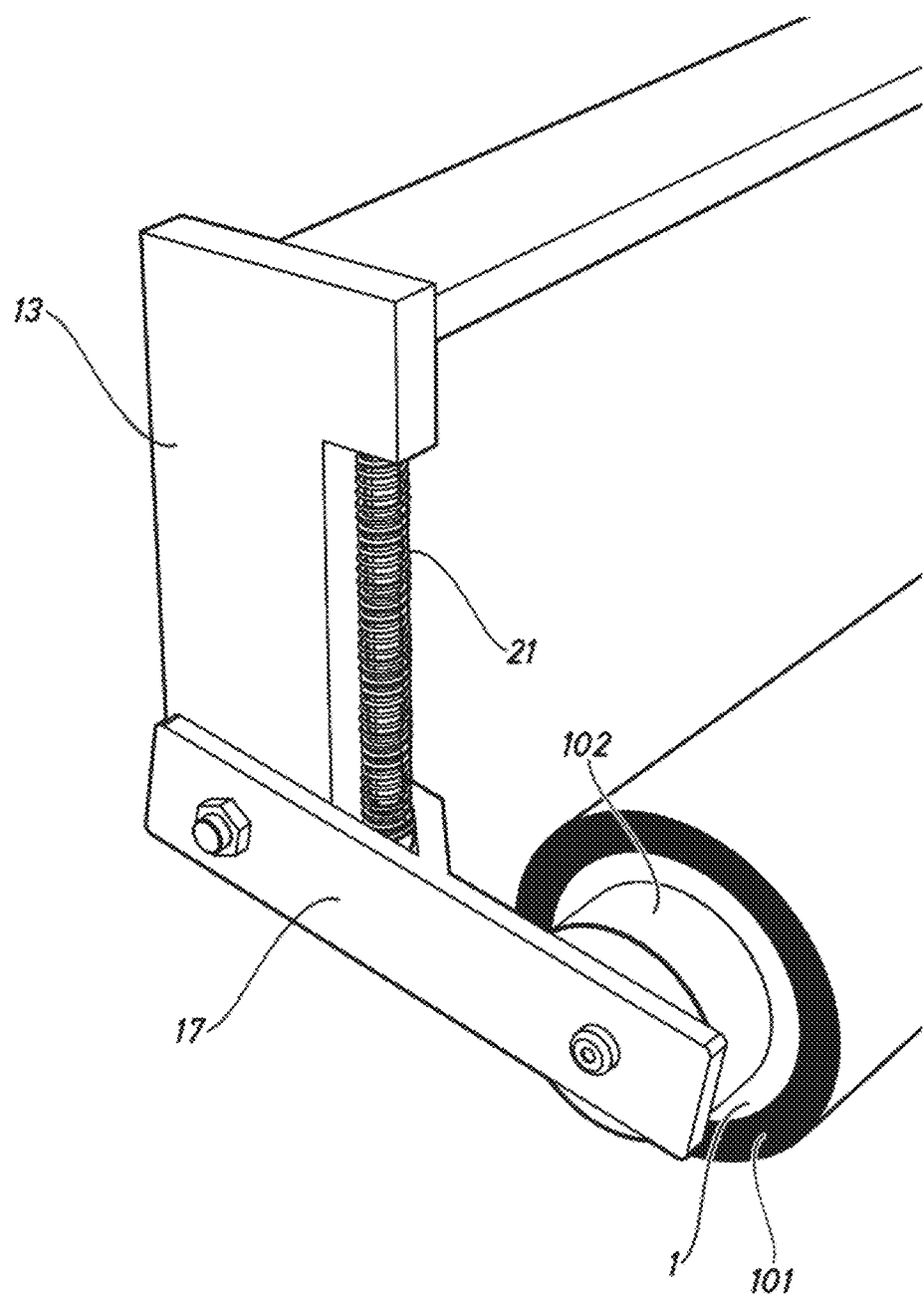
FIG. 2 is a perspective view of a detail corresponding to the idler rollers.

The device shown in the figures comprises a frame for supporting the elements, the corresponding support legs of which are in contact with the ground and may, where appropriate, have adjustment means for levelling the machine and means for fastening same to the ground. The device in the example also comprises a lower basin for collecting liquids and having an inclined base, the lowest part of which has an outlet for the liquids separated from the slurry.

The device shown comprises two compartments for separating the solids and the liquids in the slurry. Mechanical separation of the solids and the liquids in the slurry is carried out in said compartments. The compartments are arranged sequentially in the direction followed by the slurry during treatment in the compartments, i.e. the second compartment treats the solid phase from the previous compartment. In this way, a higher degree of separation between the solid and liquid phases in the slurry is achieved.

Each compartment comprises a base -7- that is concavely curved according to a cylindrical portion having a transverse axis and is formed of a simple or compound sieve, which may be composed of one or more superposed layers of fabric and/or perforated plates, preferably made of metal, it being advisable for the lower layer to be a metal sieving plate provided with holes that are relatively large in relation to the superposed sieving layer or layers, the holes in which are much smaller in size. Said lower metal plate thus forms a mechanically strong support on top of which lie the superposed sieving layer or layers, which may be of lower mechanical strength. In this way, the lower plate withstands the pressure exerted on the base -7- by the rollers -1- provided with resilient elements -21-. The upper sieve defines the size of the hole that prevents solids of a certain size from passing through the sieve towards the lower part.

The resilient element -21- may be of any type. It could be a linear spring, as in the example shown. Alternatively, it could also be a torsion spring, or another type of spring. The function of the resilient element -21- is to ensure that the roller exerts pressure on the base and does not lose contact. Each end of the roller may have an associated independent resilient element. Since both resilient elements are independent, better adaptability to possible irregularities in the base is ensured.

Idler rollers -1- travel over said bases -7-. The idler rollers -1- are mounted on corresponding shafts and can rotate freely about same. Said rollers -1- are positioned transversely in each compartment. In the example, in each compartment, there is a pair of parallel arms -13- (in FIG. 1, owing to the view, only one of them can be seen) comprising an idler roller -1- at each distal end. It is also feasible for there to only be one arm -13- for each cylinder, or any other embodiment.

On their outer cylindrical surface, the rollers -1- have a non-metal coating -101-, preferably made of gum or rubber, which prevents metal-on-metal contact between the base -7- and the cylinder -1-.

Figure 3:
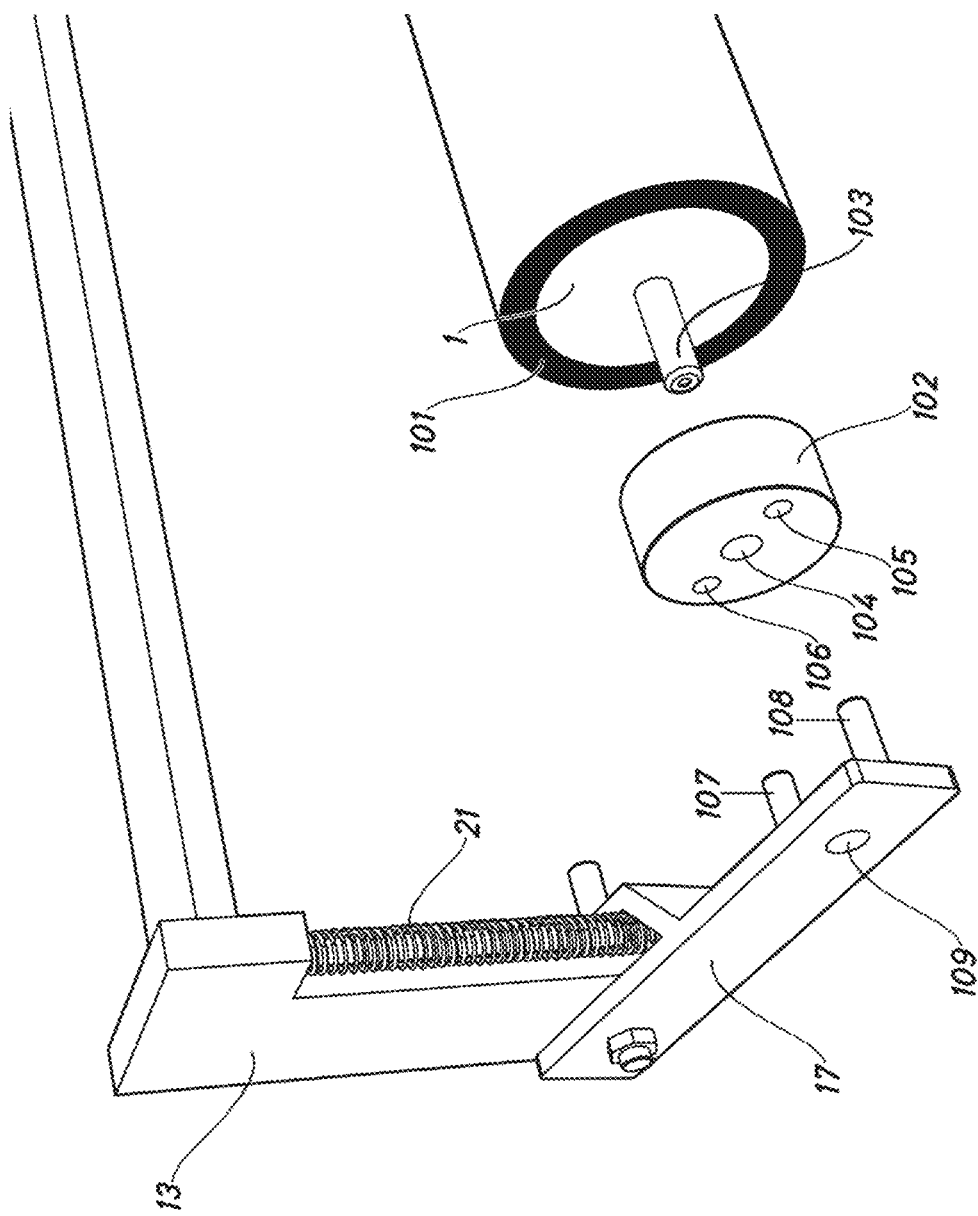
FIG. 3 is an exploded view of the detail from FIG. 2.

FIG. 3 shows a possible way to implement the rotary connection between the arms -13- and the cylinder -1- while avoiding metal-on-metal connections. On at least one of its distal ends (preferably on both distal ends), the roller -1- comprises a projection or shaft portion -103- which, for example, may be made of metal. Said shaft portion comes into contact with a hole -104- in a subcomponent -102- made of a non-metal material (for example, a plastics material having a low coefficient of friction). The shaft portion -103- rotates inside said hole. In the case shown, the subcomponent -102- comprises two additional holes -105-, -106- for connecting said subcomponent to mating projections on said bar -107-. The two additional holes -105-, -106- prevent the subcomponent -102- from rotating with respect to the bar -17-. In order to ensure that there is no metal-on-metal contact between the arm -13- and bar -17- and the cylinder -1-, the bar comprises a hole -109- that is aligned with the hole -104- in the non-metal subcomponent -102- that receives the shaft portion -103-.

A bar -17- is articulated on both ends of each pair of arms -13-. The bars -17- are subjected to the action of resilient means, such as springs -21-. Said springs -21- perform a dual function. On the one hand, they cause the rollers -1- to exert pressure on the bases -7-. Additionally, when the rollers -1- lose contact with the base -7-, said springs cause a movement having an axial component on the roller -1-, which makes it easier for the solids in the slurry to become detached from the surface of the cylinder. Furthermore, stops may be provided for limiting the outward tilt of the respective pairs of bars, and said resilient means, which act on said bars, have conventional adjustment means (not shown) which make it possible to adjust the tension applied by springs of this kind, the end of which springs is attached to the relevant arm.

Each compartment also comprises a second pair of parallel arms -33- that are rigidly connected to the aforementioned arms -13- in terms of movement. Transverse brushes -30- that are parallel to the respective rollers -1- are mounted on the end of each arm of the second pair of arms. Each brush -30- is positioned downstream of the relevant roller in the direction of rotation of the arms -13-, -25-.

The arms -13-, -25- are rigidly interconnected in terms of movement and rotate simultaneously by means of a first transverse shaft -33- to which they are attached. On account of the rotation about each first transverse shaft -33-, the respective idler rollers -1- travel over the base -7-. On account of the springs -21-, the rollers -1- simultaneously apply pressure to the relevant perforated laminar base -7- thereof and, therefore, to the slurry between the rollers and said bases. This combines the pressing action of each roller and the dragging and consequent transporting action of the slurry that has already been pressed out by the roller. Each first transverse shaft -33- may be supported by conventional bearing means.

The driving means for rotating the two first transverse shafts -33- may be composed, for example, of an electric motor, the speed of which can be adjusted. The driving means and transmissions described may be substituted by any other appropriate alternatives. Preferably, the rotational movement of the first transverse shaft -33- of each compartment is synchronised, such that each portion of already pressed slurry is dragged and transported from the end of one compartment to the start of the following compartment and is then pressed again by a roller of said following compartment that is next in line and is followed by the corresponding brush, which drags said portion of slurry towards the end of the compartment. The brushes -30- also perform a complementary cleaning action of the corresponding base -7-.

Figure 4:
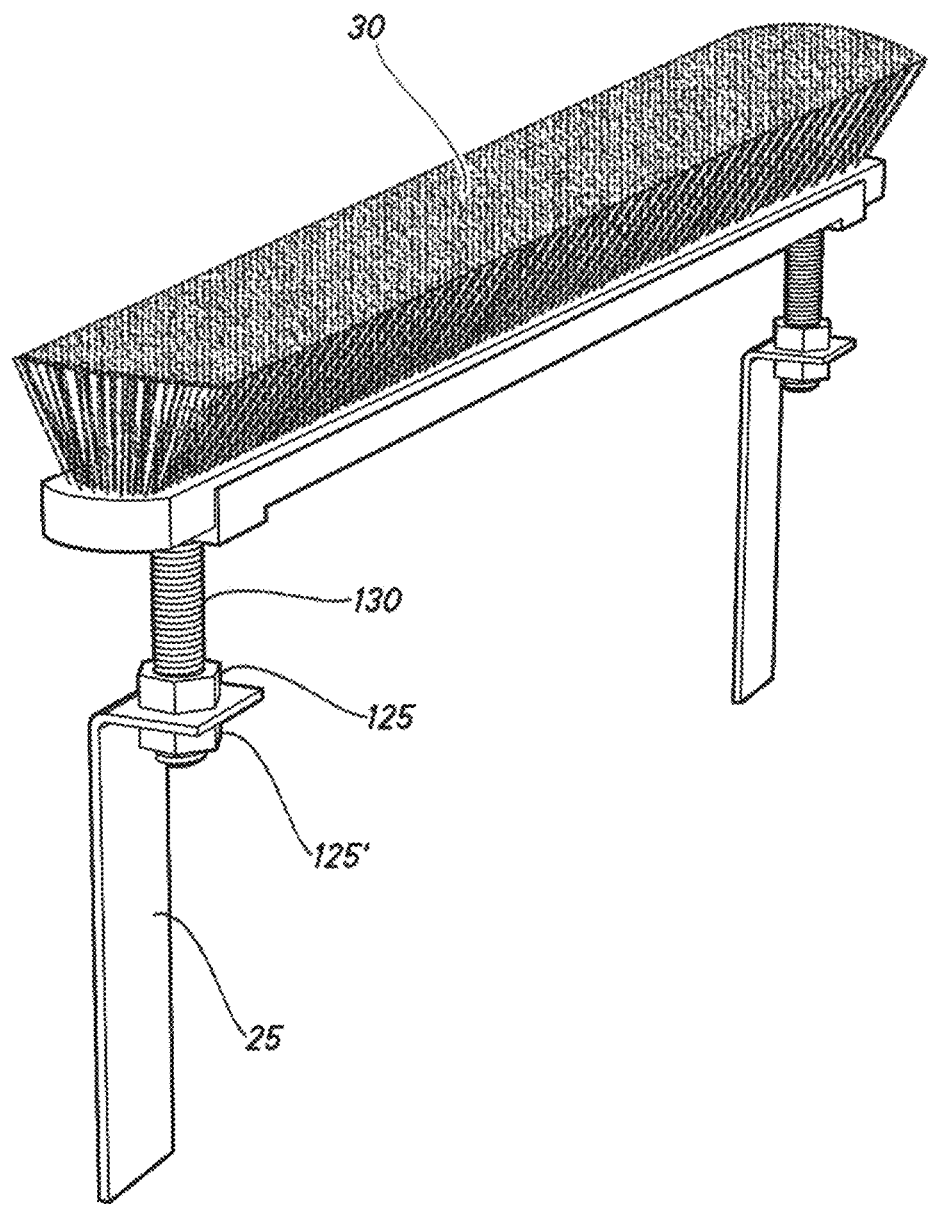
FIG. 4 is a perspective view of the detail of the adjustable connection of the brushes.
Figure 5:
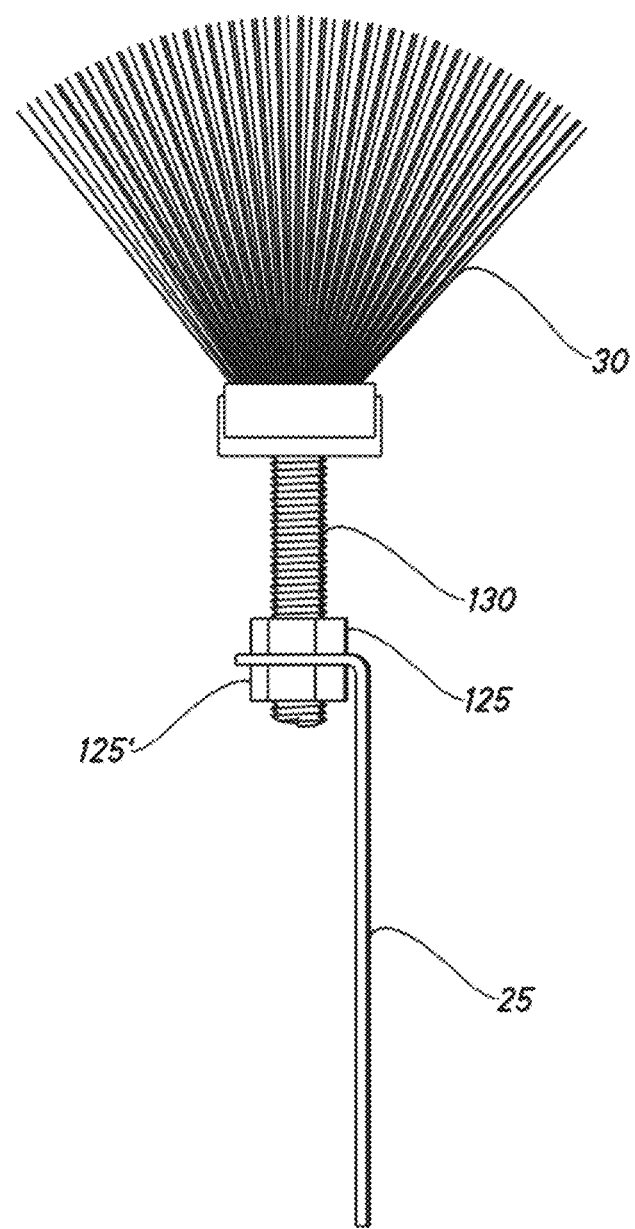
FIG. 5 is a side elevation view corresponding to the detail from FIG. 4.
Figure 6:
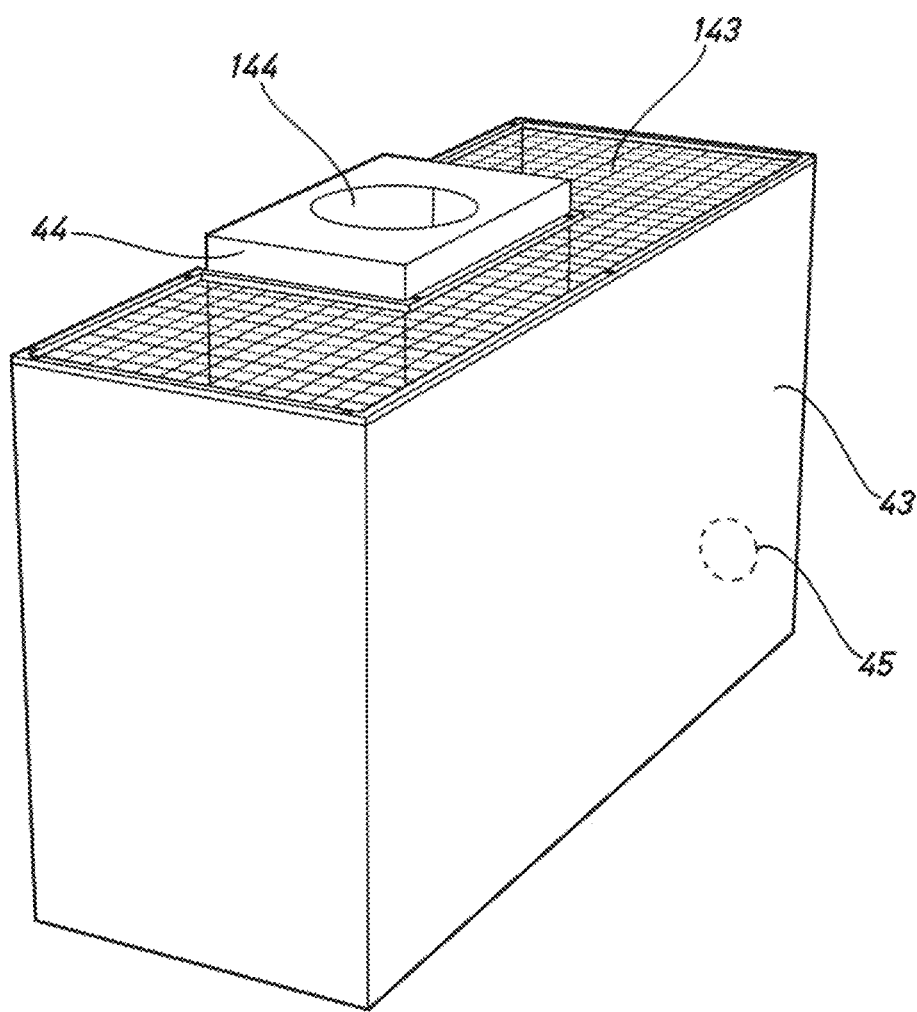
FIG. 6 is a perspective view of the tank from the example shown in the previous figures.
Figure 7:
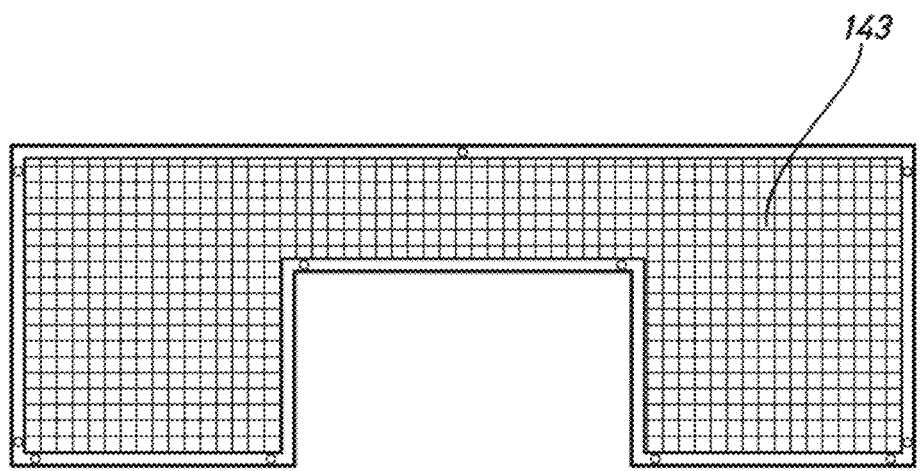
FIG. 7 is a plan view of the sieve incorporated in the tank from the previous figure.

The brushes -30- are connected in an adjustable manner to the corresponding arms -25- thereof, as shown in FIGS. 4 and 5. The brush -30- is connected to the arms -25- by means of an assembly comprising a threaded bolt -130-, a nut -125- and a locknut -125'-, which makes it possible to adjust the height of the brush in order to compensate for the wear of the brush bristles or to increase the pressure of the brush -30- on the base -7-.

The device in the example comprises a reservoir -41- for receiving the slurry to be treated. In the example, said reservoir -41- has the overall shape of a prism, is open at the top and is attached to the frame of the device, preferably such as to be able to be adjusted for levelling purposes.

The reservoir -41- is divided into two tanks -43-, -44-. The receiving tank -43- comprises an inlet -45- through which the slurry to be treated is introduced into the device. The overflow tank -44- has an upper overflow -144- that collects excess slurry coming into the machine that cannot be taken up by the rotating parts of said machine and that exits through a lower outlet -47- in said overflow tank -44-. The slurry entering the reservoir -141- exits towards the adjacent compartment over an edge contiguous therewith. Said edge is at a higher hydraulic level than the inlet -45-. The upper overflow -144- is at a higher hydraulic level than the edge.

A sieve -143- is arranged at a hydraulic level between the inlet -45- and the edge leading into the separation compartment, the purpose of which sieve is to prevent solid objects added to the slurry from entering the region of the rollers. Such additional solid objects typically include identification labels for pigs which are attached to the ear and which, over time, fall off and are caught up in the slurry. Preferably, said sieve has holes of less than 1 cm² (for example, square holes having sides of 1 cm). More preferably, the maximum length of the hole between the edges or ends thereof is 1 cm or less.

As it is desirable for the liquid content in the solid phase of the treated slurry obtained at the outlet of the machine to be as low as possible, in particular when used as an organic fertilizer, it is feasible to use more than two treatment compartments, each comprising the corresponding bases and rotating means described, as a result of which the number of pressing operations carried out on said slurry would be greater and, therefore, so too would the degree to which the liquid phase is separated with respect to the solid phase. With regard to the above, it may also prove beneficial to increase the number of "roller-brush" pairs in each compartment to obtain a higher operational yield in each treatment compartment.

The upper opening of the bases formed of at least one sieve may be positioned along a horizontal plane, as shown in FIG. 1, but may also be positioned along an inclined installation plane, having a slope or descent towards the outlet for the solid products, i.e. towards the right-hand side of the machine according to FIG. 1, in order to facilitate, in certain cases, the transport and discharge of the slurry being treated from one compartment to the next. The sieves must be made of materials that are chemically resistant to the corrosive action of the slurry, stainless steel having proven to perform well in this respect. The size of the holes or the nominal aperture of the sieves must be adapted to the specific slurry to be treated and the size of the nominal aperture of the consecutive sieves may decrease from one treatment compartment to the next. The sieves must be removable such that they can be substituted or repaired if necessary.

Automatic washing means may also be provided in the operational areas of the machine or, at the very least, of the sieves.

The slurry to be treated enters the device through the inlet -45- in the tank -43-. The plastics identifiers present in the slurry are retained in the solids-retaining sieve -143-. The slurry is discharged onto the first base -7- in a laminar flow on account of the horizontal, transverse overflow edge that said tank -43- has at the point where it is connected to the opposing front edge of the laminar base -7- of the adjacent compartment, the roller -1- being the next to act, by means of the rotation of the first transverse shaft -33-, in that said roller moves over said layer of slurry, compressing same against the base -7- and thus pressing out the liquids therefrom, which pass through the holes of the sieve in the base -7- and are collected in a collecting basin, in a continuous operation in which the solids in the slurry being treated are dragged and transported by the brush -30- towards the outlet of said compartment and into the second compartment, in which the pressing action is repeated followed by the dragging and transporting action. The solids obtained in the second compartment from the slurry being treated exit the machine over an inclined plane or ramp and can be collected for the subsequent use or destruction thereof.

The flow rate of the liquids separated from the treated slurry depends on the size of the holes of the sieves, which as indicated previously can vary between the sieves of different treatment compartments, on the nature and temperature of the slurry, and on the concentration and type of the basic components, both solid and liquid, of said slurry.

Although the invention has been described with respect to examples of preferred embodiments, these should not be considered to limit the invention, which will be defined by the broadest interpretation of the following claims.

What is claimed is:

1. A device for treating slurry by separating the solids from the liquids in the slurry, said device comprising:
a frame for supporting the elements of the machine;
at least one compartment for separating said solids and liquids, said compartment comprising a base that is concavely curved according to a cylindrical portion having a transverse axis and is formed of a sieve;
at least one idler roller that is mounted transversely on at least one arm, said arm rotating about a first transverse shaft, a rotational interface also being defined between said arm and said idler roller, which interface allows said idler roller to rotate freely about a second transverse shaft, such that a contact interface is defined between an outer surface of the idler roller and said sieve;

a subcomponent mounted at the rotational interface between said at least one idler roller and said arm, wherein the subcomponent is made of a non-metal material;

a drive which rotates said arm about the first transverse shaft; and resilient means for adjusting the pressure exerted by the rollers on the sieve, such that the rotation of the arm presses the slurry entering the machine against the sieve, and said liquids pass through the corresponding sieve, wherein the contact interface between the sieve and the roller is made of a non-metal material on at least one of the two contacting surfaces that form said interface, such that, at said interface, there is no metal-on-metal contact between surfaces moving relative to one another.

2. The device according to claim 1, wherein the roller is coated by a non-metal material.

3. The device according to claim 2, wherein the roller is coated by an elastomer.

4. The device according to claim 1, wherein the rotational interface between the roller and the arm is made of a non-metal material on at least one of the contacting surfaces that form said interface, such that, at said interface, there is no metal-on-metal contact between surfaces moving relative to one another.

5. The device according to claim 4, wherein the roller, on at least one of the ends thereof, has a shaft portion that is inserted into a hole or recess in a subcomponent which is made of a non-metal material and attached to said arm, said shaft portion coming into contact with said subcomponent at the surface of said hole or recess, the shaft portion rotating with respect to said subcomponent inside said hole.

6. The device according claim 1, wherein the compartment comprises a second arm that is capable of rotating about said first transverse shaft, said second arm likewise having a rotational interface between said second arm and a second idler roller, which interface allows said second idler roller to rotate freely about a third transverse shaft, such that a contact interface is defined between an outer surface of the second idler roller and said sieve.

7. The device according to claim 1, further comprising at least one transverse brush that is parallel to the idler roller and/or to the second idler roller and downstream thereof in the direction of movement of said arms about said first transverse shaft.

8. The device according to claim 1, further comprising a slurry inlet to the device which leads into a reservoir having a first reservoir outlet positioned at a higher hydraulic level than said slurry inlet, said first outlet leading into said separation compartment, a sieve for retaining solids being arranged between said inlet and said outlet.

9. The device according to claim 1, wherein at least two of said separating compartments are arranged in series, such that the slurry passes through both compartments sequentially.

10. The device according to claim 1, wherein the resilient pressure modulator is a spring.

11. The device according to claim 1, wherein the subcomponent is made of a plastic material having a low coefficient of friction.

* * * * *